United States Patent
Zhou et al.

(10) Patent No.: US 8,539,578 B1
(45) Date of Patent: Sep. 17, 2013

(54) SYSTEMS AND METHODS FOR DEFENDING A SHELLCODE ATTACK

(75) Inventors: Rong Zhou, SiChuan (CN); Jerry Jing, SiChuan (CN)

(73) Assignee: Symantec Corporation, Mountain View, CA (US)

( * ) Notice: Subject to any disclaimer, the term of this patent is extended or adjusted under 35 U.S.C. 154(b) by 857 days.

(21) Appl. No.: 12/687,233

(22) Filed: Jan. 14, 2010

(51) Int. Cl.
*G06F 21/00* (2013.01)

(52) U.S. Cl.
USPC .............................................. 726/22; 726/25

(58) Field of Classification Search
USPC .................. 726/22, 23, 24, 25, 26; 713/164, 713/165, 166
See application file for complete search history.

(56) References Cited

U.S. PATENT DOCUMENTS

| | | | |
|---|---|---|---|
| 7,437,759 B1 * | 10/2008 | Szor | 726/22 |
| 2007/0055711 A1 * | 3/2007 | Polyakov et al. | 707/203 |
| 2008/0016314 A1 * | 1/2008 | Li et al. | 711/200 |
| 2008/0034179 A1 * | 2/2008 | Mewhinney et al. | 711/163 |

* cited by examiner

*Primary Examiner* — Eleni Shiferaw
*Assistant Examiner* — Hilary Branske
(74) *Attorney, Agent, or Firm* — Holland & Hart LLP

(57) ABSTRACT

A computer-implemented method for defending an attack from the execution of shellcode is described. Elements within a dynamically linked library (dll) may be duplicated. The dll resides in a first memory space. The duplicated elements may be redirected into a second memory space. A protection attribute may be established for the elements within the second memory space. A location of execution code attempting to access the elements within the second memory space may be determined. The execution code may be prevented from being executed based on the determined location.

18 Claims, 12 Drawing Sheets

SYSTEMS AND METHODS FOR DEFENDING A SHELLCODE ATTACK

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Users of computer technologies continue to demand that the efficiency of these technologies increase. These demands include demands to improve the security of computing devices. Malware may infect a targeted device and allow a malicious user to take control of the targeted device.

An example of malware may include shellcode. Shellcode may originate from an attacking device and start a command shell on a targeted device. The user of the attacking device may then use the command shell to control the targeted device. Shellcode may either be local or remote, depending on whether the code provides the user control over the same machine that the code runs on (local) or over another machine through a network (remote). Users of targeted devices may not be aware that a device is under the control of a malicious user. As a result, benefits may be realized by providing systems and methods for defending against attacks caused by malware. In particular, benefits may be realized by providing systems and methods for defending a shellcode attack.

SUMMARY

According to at least one embodiment, a computer-implemented method for defending an attack from the execution of shellcode is described. Elements within a dynamically linked library (dll) may be duplicated. The dll resides in a first memory space. The duplicated elements may be redirected into a second memory space. A protection attribute may be established for the elements within the second memory space. A location of execution code attempting to access the elements within the second memory space may be determined. The execution code may be prevented from being executed based on the determined location.

In one configuration, the dll is a kernel32.dll. The determined location of the execution code may indicate that the code is running on a heap memory allocation. Alternatively, the determined location of the execution code may indicate that the code is running on a stack memory allocation. In one embodiment, the executing code may be allowed to execute if the determined location indicates the code is not running on a heap or stack memory allocation.

In one example, one or more links may be modified to point to elements within the second memory space instead of elements within the first memory space. The modified links may point to an InLoadOrderModuleList, an InMemoryOrderModuleList, and an InInitializationOrderModuleList.

In one embodiment, the protection attribute is a PAGE_GUARD|PAGE_EXECUTE_READWRITE attribute. In addition, an exception handler may be established to identify an exception raised by the protection attribute for elements within the second memory space. Further, the exception handler may be used to determine the location of the execution code attempting to access the elements within the second memory space.

A computer system configured to defend an attack caused by the execution of shellcode is also described. The computer system may include a processor and memory in electronic communication with the processor. The computer system may also include a shellcode detection module configured to duplicate elements within a dynamically linked library (dll). The dll may reside in a first memory space. The module may be further configured to redirect the duplicated elements into a second memory space, and establish a protection attribute for the elements within the second memory space. In addition, the module may be configured to determine a location of execution code attempting to access the elements within the second memory space, and prevent the execution code from executing based on the determined location.

A computer-program product for defending an attack from the execution of shellcode is also described. The computer-program product may include a computer-readable medium having instructions thereon. The instructions may include code programmed to duplicate elements within a dynamically linked library (dll). The dll may reside in a first memory space. The instructions may also include code programmed to redirect the duplicated elements into a second memory space, and code programmed to establish a protection attribute for the elements within the second memory space. The instructions may further include code programmed to determine a location of execution code attempting to access the elements within the second memory space, and code programmed to prevent the execution code from executing based on the determined location.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
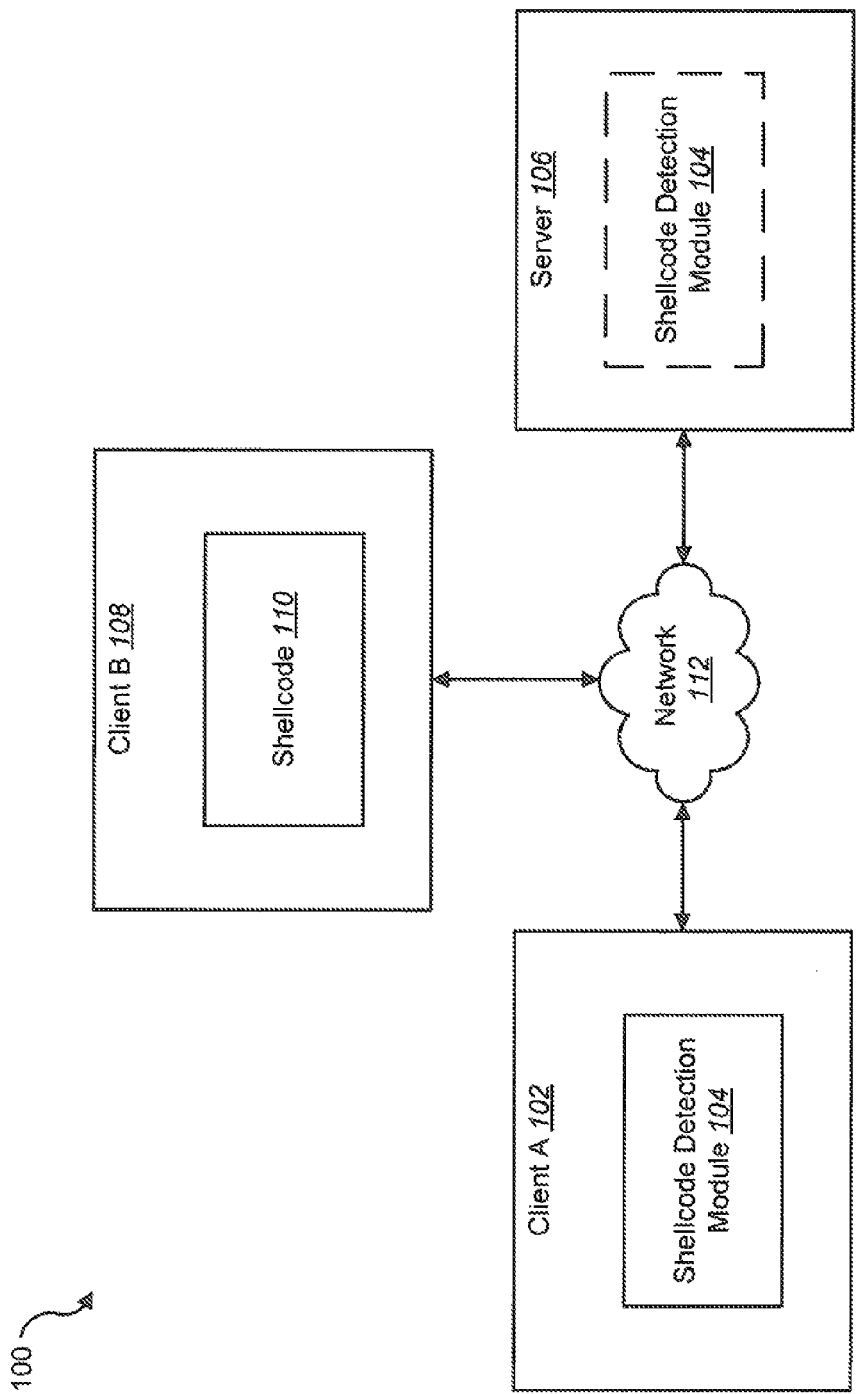
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In one embodiment, shellcode represents pieces of assembly language which are used to launch shells. The shellcode may be used as the payload in the exploitation of a software vulnerability. In one configuration, shellcode may originate from an attacking device and start a command shell on a targeted device. The user of the attacking device may then use the command shell to control the targeted device. Shellcode may either be local or remote, depending on whether the code provides the user control over the same machine that the code runs on (local) or over another machine through a network (remote).

In one example, a particular type of remote shellcode may download and execute some form of malware on the targeted device. This type of remote shellcode may not spawn a command shell. Instead, the remote shellcode may instruct the targeted device to download a certain executable file from a network, save the file to disk, and execute the file. This type of attack may be used in a drive-by download attack, where malware may be downloaded without knowledge of the user of the targeted device. For example, a targeted device may visit a malicious webpage that attempts to download and execute shellcode (unknowingly to the user of the targeted device) in order to install malware on the targeted device.

Many types of shellcode may attempt to acquire the base address of a particular dynamically linked library (dll) before calling application programming interfaces (APIs). These APIs may be called on to perform mal-behaviors, such as, but not limited to, malware downloading, file writing, and execution. In one example, shellcode may attempt to acquire the base address of a kernel32.dll before calling APIs to perform the functions described above. The kernel32.dll may be present in the 32-bit and 64-bit versions of MICROSOFT WINDOWS®. This dll may expose to applications most of the Win32 base APIs, such as memory management, input/output operations, process and thread creation, and synchronization functions.

In one example, the execution code of the shellcode typically runs on heap or stack memory allocations. Heap-based memory allocation may refer to the allocation of memory storage for use in a computer program during the runtime of that program. The memory allocated through heap-based memory allocation may exist until it is explicitly released. In contrast, stacks may refer may refer to regions of memory where data is added or removed in a last-in-first-out manner. Memory on the stack may be automatically reclaimed when a function exits.

In one embodiment, the present systems and methods may identify the location of the execution code of the shellcode attempting to acquire the base address of the kernel32.dll. Because execution of shellcode runs on heap or stack memory allocations, a shellcode attack may be detected immediately. The present systems and methods may be proactive, accurate, and independent of signatures in detecting shellcode attacks.

Currently, vulnerability attacks are a popular way to spread malware, such as through a drive-by download technique described above. Another example of a vulnerability attack may include a zero-day attack. This type of attack (or threat) attempts to exploit vulnerabilities of applications that may be unknown to others, undisclosed to the vendor of the applications, or for which no security fix is available. Zero-day attacks may be used or shared by users of attacking devices before the vendor of an application is aware of the vulnerability. Because of the delay of Intrusion Prevention System (IPS) detection mechanisms, and the relative quickness in which a file scan detection mechanism becomes out-of-date due to script obfuscation, benefits may be realized by providing systems and methods to effectively and efficiently detect a zero-day vulnerability attack before the signature is released. In addition, benefits may be realized by providing systems and methods for detecting an obfuscated attack when the signature is invalid.

In one configuration, Windows® applications interact with an operating system (OS) through callings to APIs. Examples of two APIs may include LoadLibrary and GetProcAddress. In one embodiment, both of these APIs may be exported by the kernel32.dll. As previously stated, a shellcode may attempt to acquire the base address of the kernal32.dll's memory image. The shellcode may then attempt to acquire the address of LoadLibrary and GetProcAddress. Having obtained the addresses of these two APIs, the shellcode may allow malware to load specific dlls on the targeted device, obtain addresses for additional APIs, such as URLDownLoadToFile, CreatFile, WriteFile, CopyFile, CreateProcess, ShellExecute, etc. Table 1 below illustrates an example of execution code in the shellcode that may be used to acquire the base address of the kernel32.dll.

TABLE 1

| | |
|---|---|
| mov | eax, [fs:30h] |
| mov | eax, [eax+0ch] |
| mov | eax, [eax+1ch] |
| mov | eax, [eax] |
| mov | eax, [eax+8h] |

By identifying the location of the execution code that attempts to acquire the base address of the kernel32.dll, and determining whether the execution code is running on heap or stack memory allocations, a shellcode attack (or threat) may be detected.

FIG. 1 is a block diagram illustrating one embodiment of an environment 100 in which the present systems and methods may be implemented. In one example, client A 102 may include a shellcode detection module 104. The detection module 104 may detect shellcode 110 that may originate locally (from client A 102) or remotely from client B 108. The shellcode 110 may be executed in an attempt for client B 108 to assume control of client A 102. For example, client B 108 may attempt to execute the shellcode 110 in order to take control of client A 102 across a network connection 112, such as an intranet or the Internet. Client A 102 and client B 108 may be a personal computer (PC), a laptop, a personal digital assistant (PDA), a smartphone, or any other type of computing device.

In one embodiment, the shellcode detection module 104 may be located on a server 106. The server 106 may be in communication with client A 102 across the network connection 112. The detection module 104 located on the server 106 may monitor client A 102 and detect when the shellcode 110 originating from client B 108 is attempting to execute on client A 102.

Figure 2:
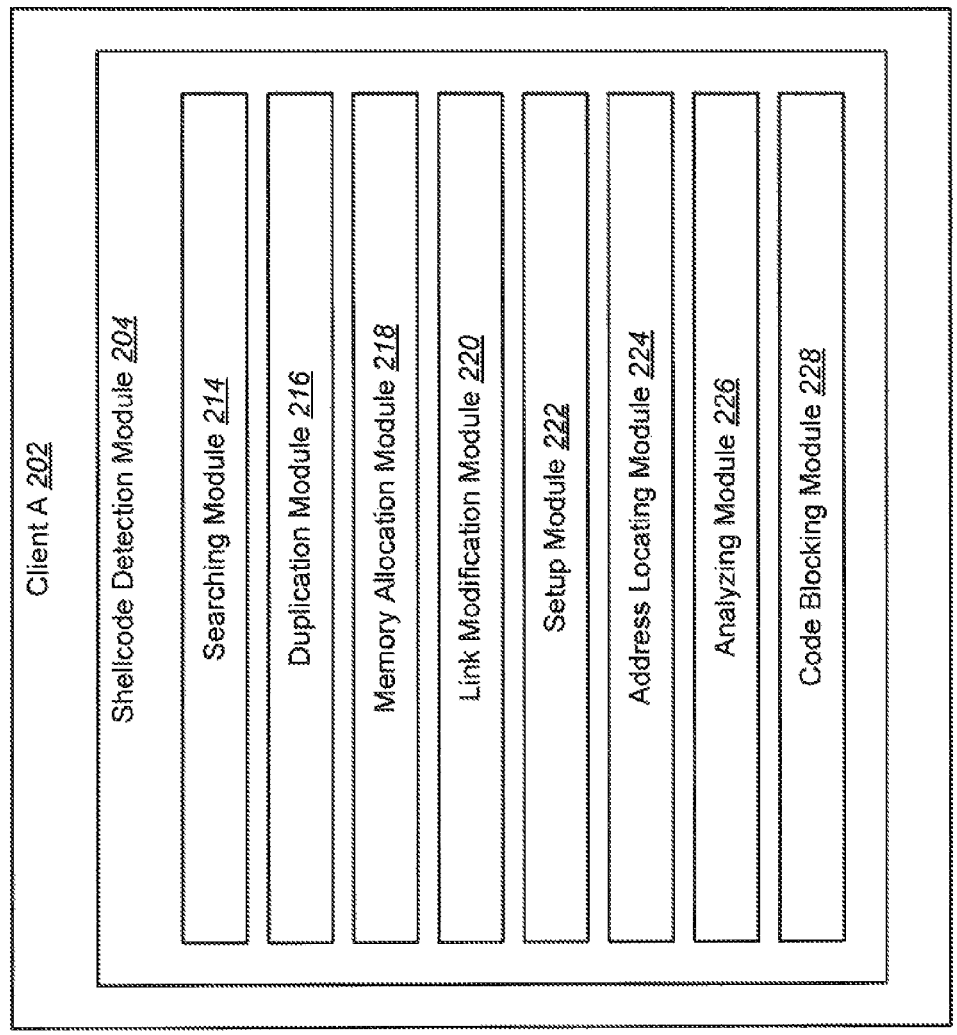
FIG. 2 is a block diagram illustrating a further embodiment of a client that may implement the present systems and methods.

FIG. 2 is a block diagram 200 illustrating a further embodiment of client A 202. As previously mentioned, client A 202 may include a shellcode detection module 204. The detection module 204 may detect the execution of shellcode originating locally from client A 202 or from a client located remotely from client A 202. The shellcode may be executed in order to attempt to take control of client A 202.

In one configuration, the shellcode detection module 204 may include a searching module 214. The searching module 214 may search the memory of client A 202 for information relating to a dll, such as the kernel32.dll. The detection module 204 may also include a duplication module 216. The duplication module 216 may duplicate the information of the dll found by the searching module 214. For example, the duplication module 216 may duplicate the information within the kernel32.dll.

A memory allocation module 218 may allocate a new memory space within client A 202. In one configuration, the duplicated information obtained by the duplication module 216 may be placed in the newly allocated memory. A link modification module 220 may modify one or more links (or pointers) that point to information in the kernel32.dll stored in the previous memory space. The links may be modified by the modification module 220 to point to information of the kernel32.dll within the newly allocated memory.

The shellcode detection module 204 may further include a setup module 222. In one configuration, the setup module 222 may set up various protection attributes for information within the newly allocated memory. For example, the setup module 222 may set up a protection so that information within the newly allocated memory may not be modified, accessed, etc. by executing code. In one embodiment, an address locating module 224 may determine the address (or location) of executing code attempting to execute on the client A 202. An analyzing module 226 may analyze the code attempting to execute, as well as the location determined by the address locating module 224, to determine whether the executing code is shellcode attempting to execute on client A 202. If the analyzing module 226 determines that the code attempting to execute is shellcode, a code blocking module 228 may prevent (or block) the code from executing on client A 202.

Figure 3:
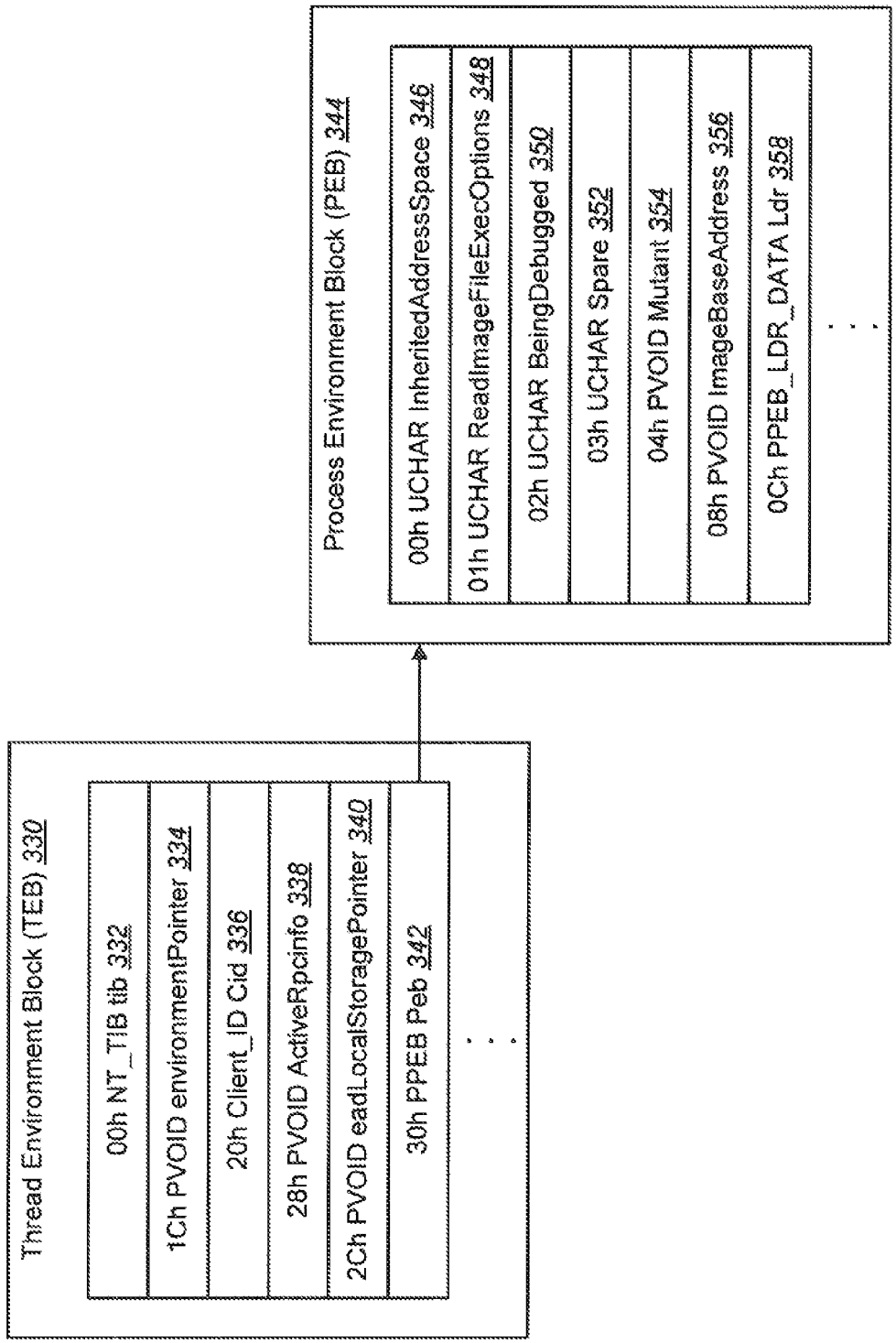
FIG. 3 is a block diagram illustrating one embodiment of thread environment block (TEB)

FIG. 3 is a block diagram illustrating one embodiment of a thread environment block (TEB) 330. The TEB 330 may be a data structure that stores information about a currently running thread. In one example, the TEB 330 may include a pointer that points to a process environment block (PEB) 344.

In one configuration, the elements of the TEB 330 may be accessed as an offset of the segment register FS. For example, the elements of the TEB 330 may be accessed by an offset from FS:[0]. As a result, the first element (i.e., NT_TIB tib 332) in the TEB 330 may be at position FS:[0] of the segment register. The other elements 334, 336, 338, 340, 342 within the TEB 330 may also be associated with a certain position within the TEB 330. These various positions may be offsets from FS:[0]. For example, an environment pointer 334 may be located at the position FS:[0x1Ch] in the segment register, and a client identification 336 may be positioned within the TEB 330 at the position FS:[0x20h] in the segment register. Further, an active RPC handle 338 may be located at the position FS:[0x28h], and a local storage pointer 340 may be located at the position FS:[0x2Ch]. Finally, a linear address 342 corresponding to the PEB 344 may be located at the position FS:[0x30h]. In other words, a pointer 342 to the PEB 344 may be positioned at the position FS:[0x30h].

In one embodiment, the PEB 344 may include elements 346, 348, 350, 352, 354, 356, 358 that may allow access to import tables, process start-up arguments, image names, etc. For example, an address space indicator 346 may be positioned at the position 00h within the PEB 344. Similarly, a read image file options element 348 may be positioned at the position 01h. Further, a debugging element 350 may be positioned at the position 02h, and a spare element 352 may be located at the position 03h. A mutant element 354 may be positioned at the position 04h, and the base address of the image 356 may be positioned at the position 08h. Finally, a pointer 358 to a loader data module may be positioned at the position 0Ch. Details regarding the loader data will be described below.

Figure 4:
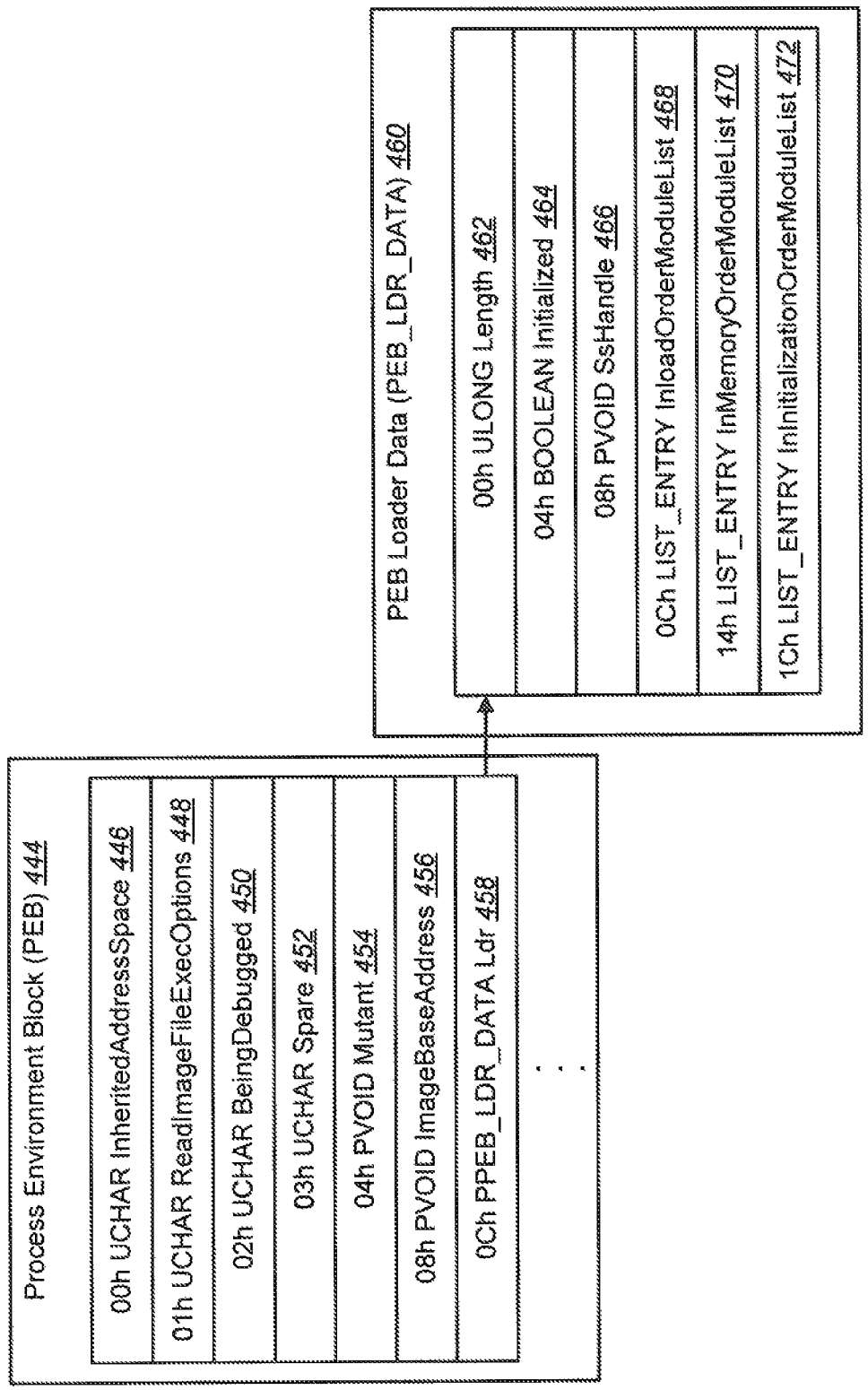
FIG. 4 is a block diagram illustrating one embodiment of a PEB and a PEB loader data module (PEB_LDR_DATA)

FIG. 4 is a block diagram illustrating one embodiment of a PEB 444 and a PEB loader data module (PEB_LDR_DATA) 460. As previously explained the PEB 444 may include various elements 446, 448, 450, 452, 454, 456, 458. In one embodiment, a pointer 458 to the PEB_LDR_DATA module 460 may be positioned at position 0Ch within the PEB 444. The loader data module 460 may also include various elements 462, 464, 466, 468, 470, 472. For example, the module 460 may include a length 462 element at position 00h, and an initialization element 464 at position 04h. In addition, the loader data module 460 may include an SsHandle element 466 at position 08h. Further, the loader data module 460 may include pointers 468, 470, 472 which point to various lists. For example, a first pointer 468 to an InLoadOrderModuleList may be located at position 0Ch. In addition, a second pointer 470 to an InMemoryOrderModuleList may be positioned at position 14h, and a third pointer 472 to an InInitializationOrderModuleList may be located at the position 1Ch.

Figure 5:
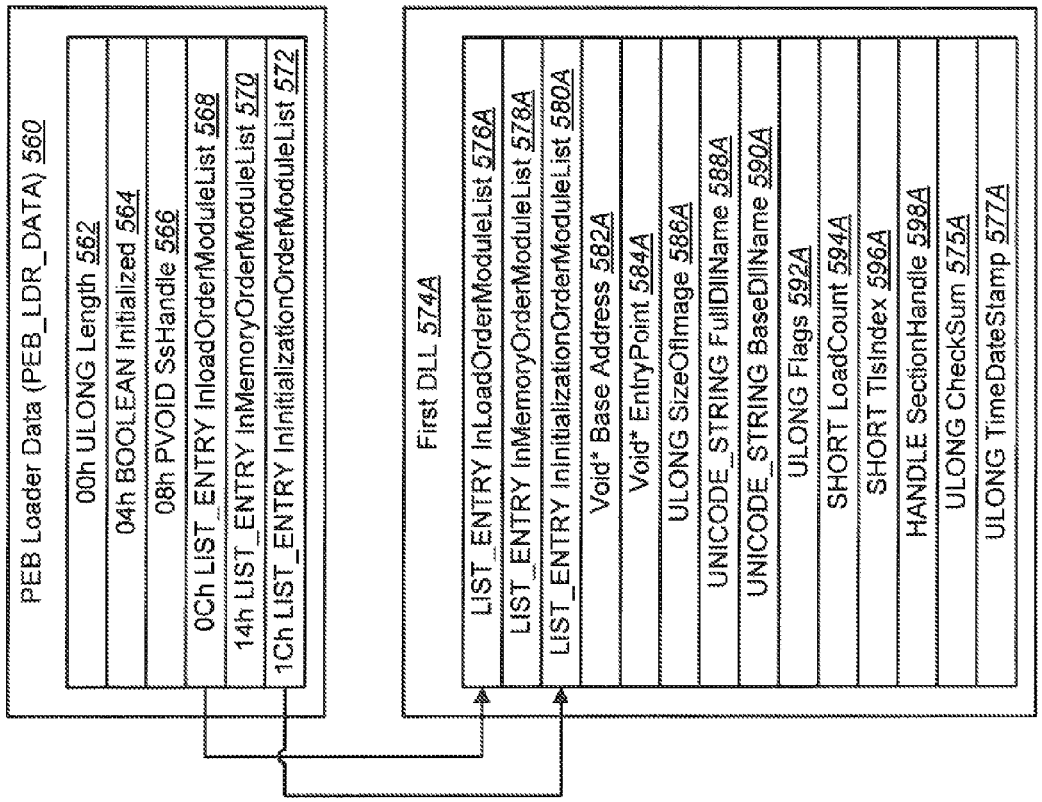
FIG. 5 is a block diagram illustrating one embodiment of a loader data module (LDR_DATA)

FIG. 5 is a block diagram illustrating one embodiment of a loader data module 560 with pointers 568, 572 that may point to items or information within a first dll 574A. As depicted, loader data module 560 may include elements 562, 564, 566, 568, 570, and 572. The first dll 574A may include elements 576A, 578A, 580A, 582A, 584A, 586A, 588A, 590A, 592A, 594A, 596A, 598A, 575A, and 577A. For example, an InLoadOrderModuleList pointer 568 within the loader data module 560 may point to an InLoadOrderModuleList pointer 576A within the first dll 574A. In addition, at position 1Ch within the loader data module 560, an InInitializationLoaderModuleList 572 pointer may point to an InInitializationOrderModuleList pointer 580A within the first dll 574A. Other elements that may be included within the first dll 574A may include a base address 582A which may indicate the base address of the loaded dll 574A. In addition, the first dll 574A may include an entry point 584A that may indicate the dll entry point specified in a portable executable (PE) header. In addition, the first dll 574A may include information regarding the size of the image 586A, as well as a full dll name item 588A. The full dll name item 588A may indicate the full path of the first dll 574A. The first dll 574A may also include a base dll name item 590A, as well as other items including flags 592A, load count 594A, a TlsIndex 596A, and a SectionHandle item 598A. In addition, the first dll 574A may include a CheckSum 575A which may include the CheckSum from the image header of the first dll 574A. In addition, a Time- DateStamp item 577A may be included within the first dll 574A. The TimeDateStamp item 577A may indicate the time at which the first dll 574A was built or created.

Figure 6:
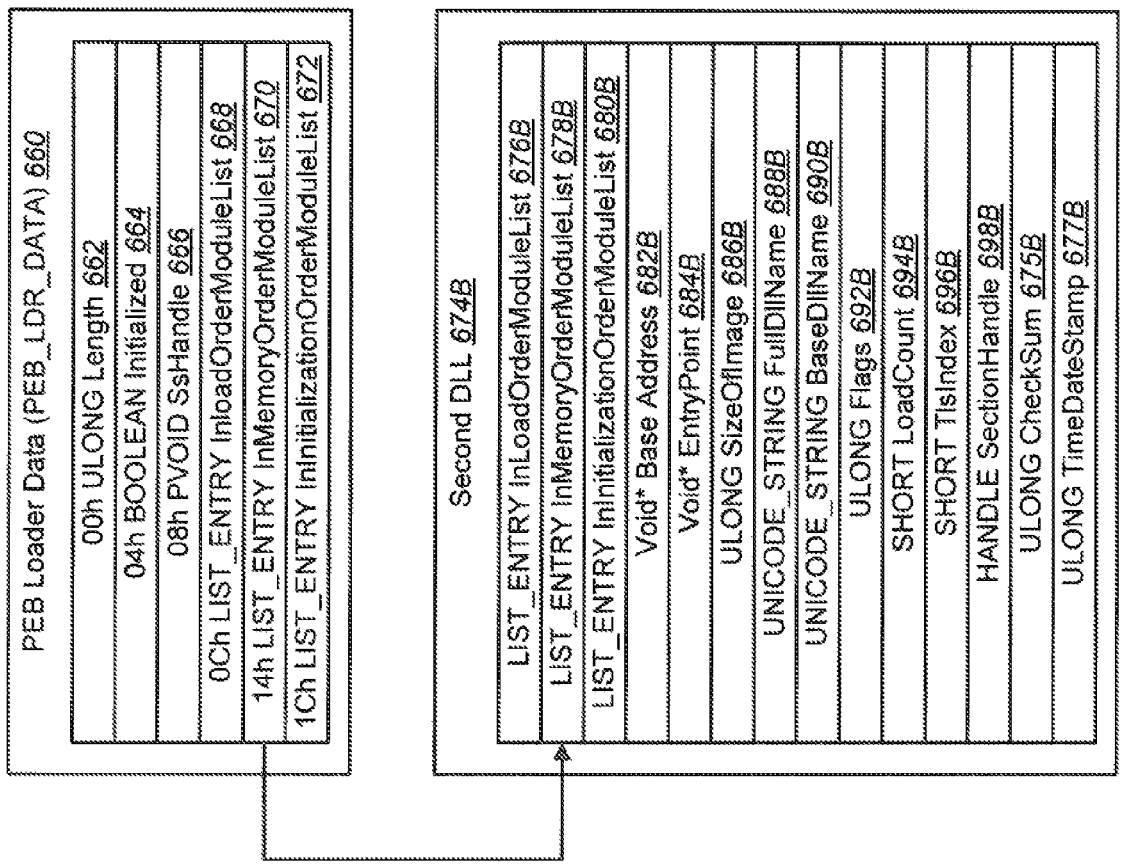
FIG. 6 is a block diagram illustrating one embodiment of a LDR_DATA module pointing to a dynamically linked library (dll)

FIG. 6 is a block diagram illustrating one embodiment of a loader data module 660 pointing to a second dll 674B. As depicted, loader data module 660 may include elements 662, 664, 666, 668, 670, and 672. In one example, an InMemoryOrderModuleList pointer 670 within the loader data module 660 may point to an InMemoryOrderModuleList pointer 678B within the second dll 674B. As illustrated, the second dll 674B may include items 676B, 678B, 680B, 682B, 684B, 686B, 688B, 690B, 692B, 694B, 696B, 698B, 675B, and 677B that may be similar to the items previously discussed in FIG. 5.

Figure 7:
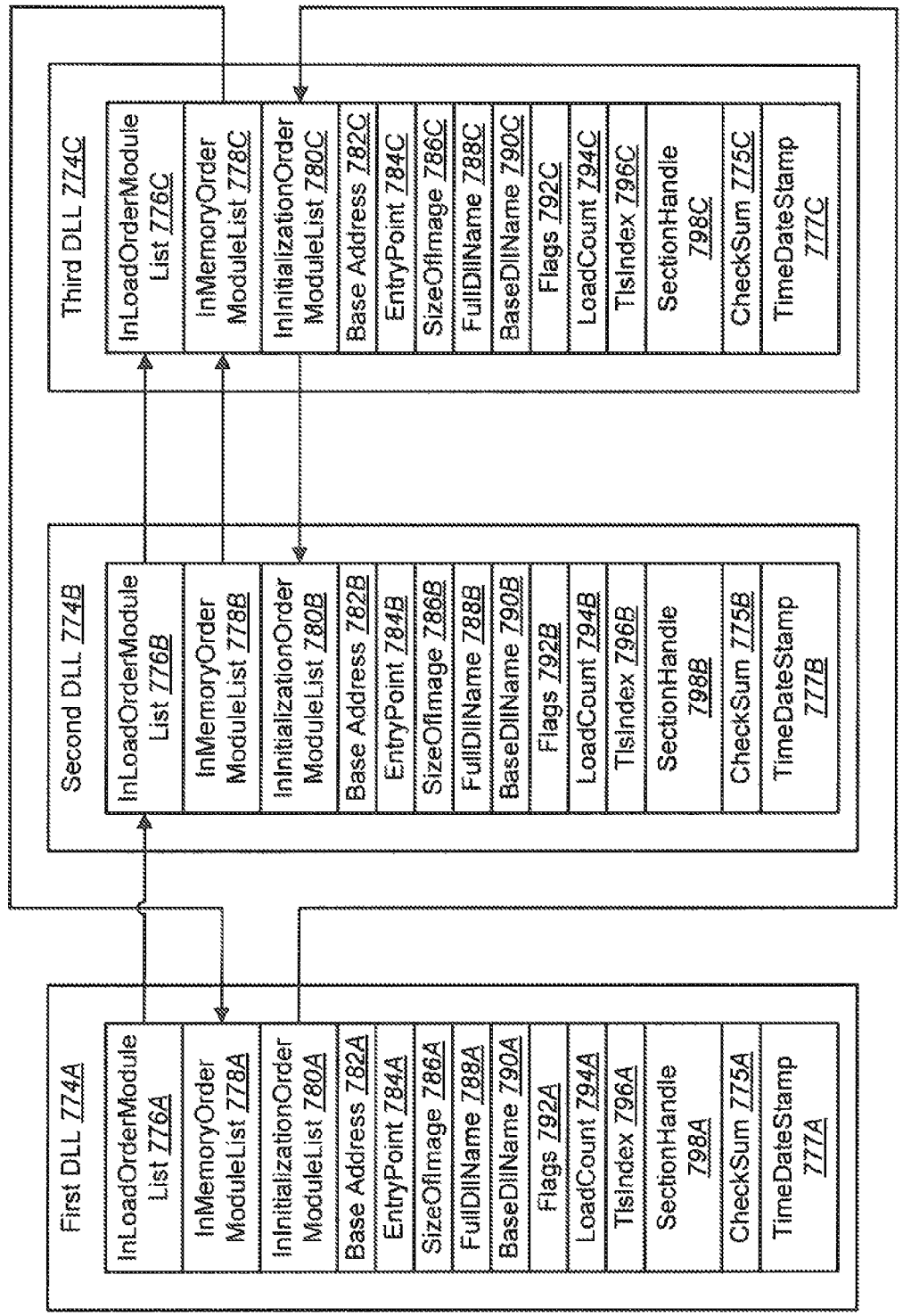
FIG. 7 is a block diagram illustrating one embodiment of multiple dlls.

FIG. 7 is a block diagram illustrating one embodiment of multiple dlls 774A, 774B, 774C. As illustrated, each dll may point to various items within the other dlls. As depicted, the first dll 774A may include elements 776A, 778A, 780A, 782A, 784A, 786A, 788A, 790A, 792A, 794A, 796A, 798A, 775A, and 777A, the second dll 774B may include elements 776B, 778B, 780B, 782B, 784B, 786B, 788B, 790B, 792B, 794B, 796B, 798B, 775B, and 777B, and the third dll 774C may include elements 776C, 778C, 780C, 782C, 784C, 786C, 788C, 790C, 792C, 794C, 796C, 798C, 775C, and 777C. For example, in the first dll 774A, and InLoadOrderModuleList pointer 776A may point to an InLoadOrderModuleList pointer 776B, 776C within the second dll 774B and the third dll 774C, respectively. Similarly, an InMemoryOrderModuleList pointer 778B within the second dll 774B may point to an InMemoryOrderModuleList pointer 778C, 778A within the third dll 774C and the first dll 774A, respectively. In addition, an InInitializationOrderModuleList pointer 780A within the first dll 774A may point to an InInitializatonOrderModuleList pointer 780C, 780B within the third dll 774C and the second dll 774B, respectively. In one configuration, each of the dlls 774A, 774B, 774C may include elements previously discussed above. An example of the first dll 774A may include an Ntdll.dll. An example of the second dll 774B may include the kernel32.dll, and an example of the third dll 774C may include a user32.dll.

Figure 8:
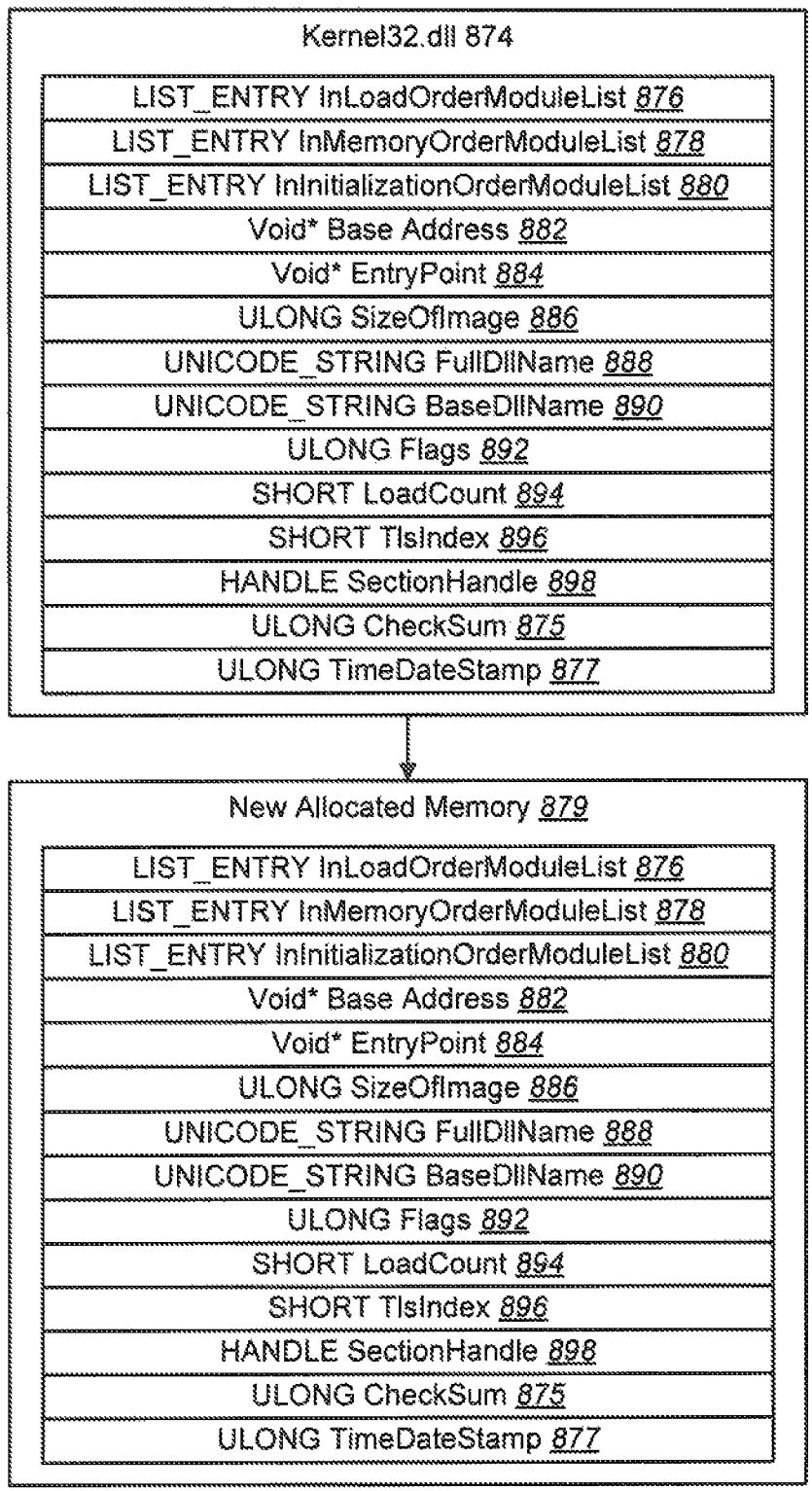
FIG. 8 is a block diagram illustrating one embodiment of a dll.

FIG. 8 is a block diagram illustrating one embodiment of a dll, such as the kernel32.dll 874. As depicted, the kernel32.dll 874 may include elements 876, 878, 880, 882, 884, 886, 888, 890, 892, 894, 896, 898, 875, and 877. In one configuration, a new allocated memory 879 may be created. In one example, the information or elements within the kernel32.dll 874 may be duplicated and placed in the new allocated memory 879, thus, the new allocated memory 879 may include copies of elements 876, 878, 880, 882, 884, 886, 888, 890, 892, 894, 896, 898, 875 and 877.

Figure 9:
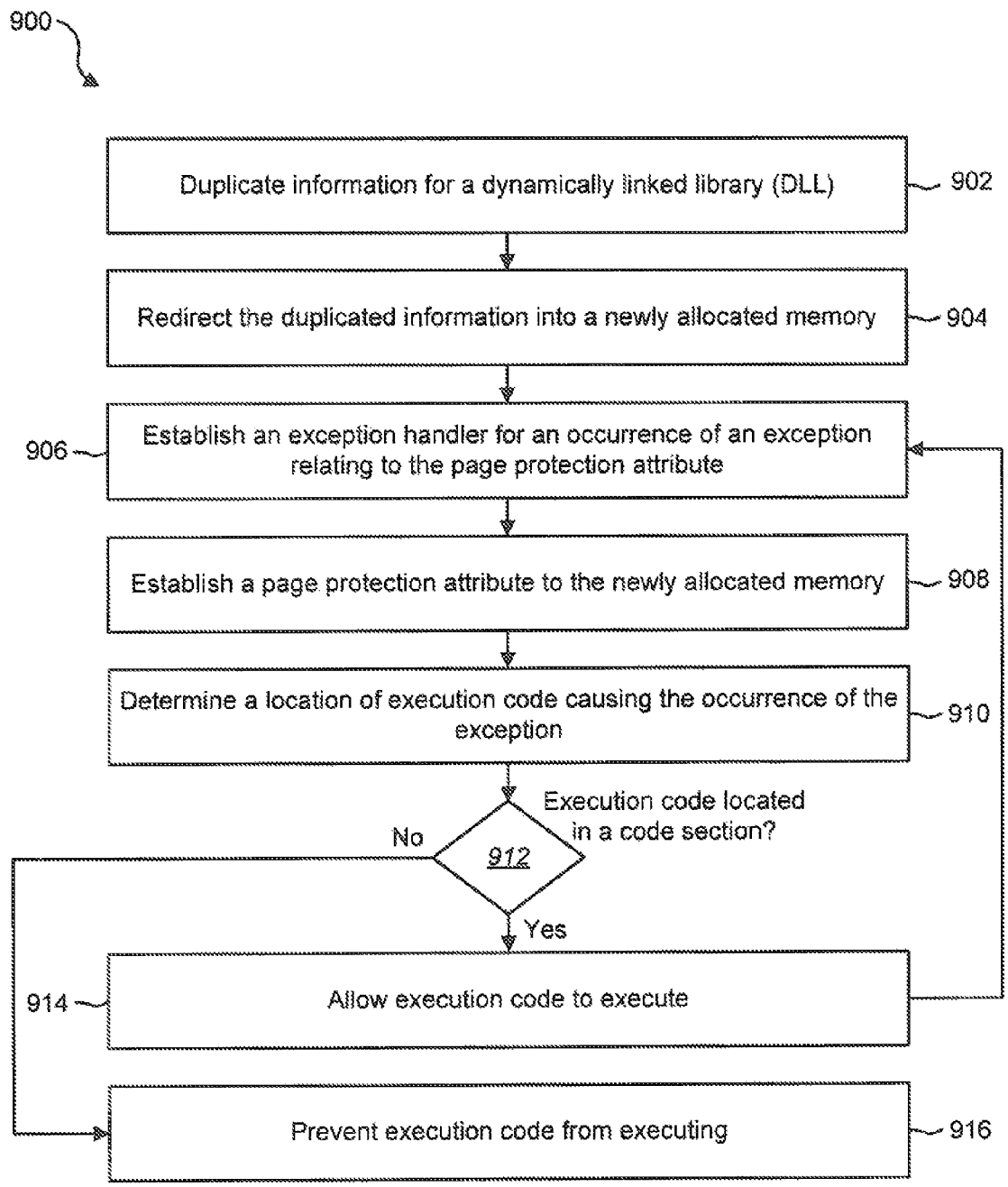
FIG. 9 is a flow diagram illustrating one embodiment of a method for detecting the execution of shellcode.

FIG. 9 is a flow diagram illustrating one embodiment of a method 900 for detecting the execution of shellcode. In one embodiment, the method 900 may be implemented by the shellcode detection module 104.

In one configuration, information for a dll may be duplicated 902. For example, the memory of a targeted device may be searched in order to locate the elements of a dll, such as the kernel32.dll. As previously explained, the kernel32.dll may be a structure of a loader data module. In one configuration, the duplicated elements of the dll may be redirected 904 into a newly allocated memory space. In other words, elements of the kernel32.dll may be copied to the new memory. Further, links pointed to an InLoadOrderModuleList, an InMemoryOrderModuleList, and an InInitializationOrderModuleList within the previous memory space may be modified to point to the newly allocated memory space.

In one embodiment, an exception handler may be established 906. The handler may be designed to flag (or catch) an exception that is raised due to a page protection attribute. For example, an AddVectorExceptionHandler API may be called to establish a Vectored Exception Handler (VEH). In one configuration, the VEH may be designed to catch the EXCEPTION_GUARD_PAGE exception. An exception handler may be defined as below in Table 2.

TABLE 2

LONG WINAPI
VectoredHandler (
struct_Exception_Pointers *ExceptionInfo
)

In one embodiment the VectoredHandler may be invoked to catch the EXCEPTION_GUARD_PAGE exception.

In one configuration, a page protection attribute may be established 908 for the newly allocated memory. For example, the protection attribute for the newly allocated memory may be set as a PAGE_GUARD|PAGE_EXECUTE_READWRITE attribute. As a result, when a central processing unit (CPU) accesses the newly allocated memory, an exception may be raised because of the established page protection attribute. For example, an EXCEPTION_GUARD_PAGE exception may be raised.

In one embodiment, the location of execution code causing the occurrence of the exception may be determined 910. The base address of the execution code may be obtained with an extended instruction pointer (EIP) associated with the VectoredHandler. In one embodiment, the EIP value of the VectoredHandler may be obtained using VirtualQueryEx( ) Once the EIP is determined, the content of the base address pointed to by the EIP may be checked to verify whether it begins with 'MZ'. A determination 912 may be made as to whether the execution code is located in a code section. For example, if the content of the base address of the execution code begins with 'MZ', it may be determined 912 that the execution code is located in a code section, and the execution code may be allowed 914 to execute. In other words, if the location of the execution code is in code section, it may be assumed to be a normal and legitimate execution of code.

If the code is allowed to execute, the protected memory attribute described above may be set as PAGE_EXECUTE_READWRITE to allow the program to continue executing. In addition, a SINGLE_STEP bit may be set in thread context in order to enable the memory protection attribute to be established again. In one embodiment, setting the SINGLE_STEP may cause an EXCEPTION_SINGLE_STEP exception when the next instruction is executed. Through an EXCEPTION_SINGLE_STEP exception handler, PAGE_GUARD PAGE_EXECUTE_READWRITE masks may be set to the allocated memory again in order to reopen the memory protection.

If, however, it is determined 912 that the execution code is not located in a code section (e.g., the content of the base address pointed to by the EIP does not begin with 'MZ'), the execution code may be prevented 916 from executing. For example, if the location of the execution code is on heap or stack, the execution code may be assumed to be shellcode and may be blocked or prevented 916 from executing.

Figure 9A:
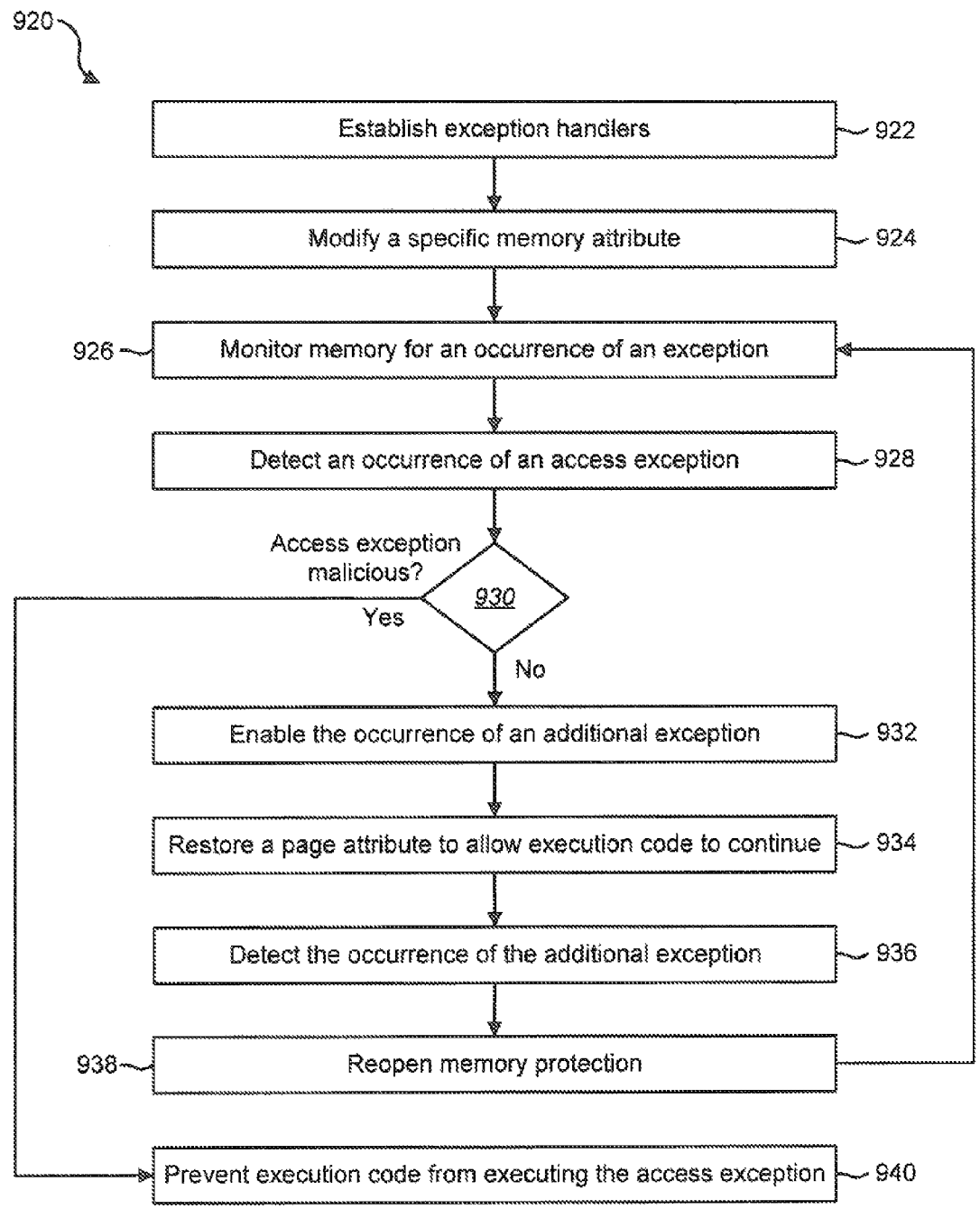
FIG. 9A is a flow diagram illustrating a further embodiment of a method for detecting the execution of shellcode.

FIG. 9A is a flow diagram illustrating another embodiment of a method 920 for detecting the execution of shellcode. In one embodiment, the method 920 may be implemented by the shellcode detection module 104.

In one configuration, one or more exception handlers may be established 922. In addition, a specific memory attribute may be modified 924 once the exception handlers are set up. In one embodiment, the memory attribute may be monitored 926 in order to detect 928 an occurrence of an exception. In one example, an occurrence of an access exception may be detected 928. Once the occurrence of the access exception has been detected 928, a determination 930 may be made as to whether the access exception is malicious. If it is determined 930 that the access exception is malicious, execution code may be prevented 940 from executing the access exception.

If, however, it is determined 930 that the access exception is not malicious, the occurrence of an additional exception may be enabled 932. For example, as previously explained, an exception handler_1 may set up the SINGLE_STEP to cause the occurrence of the additional exception. In one embodiment, a page attribute may be restored 934 in order to allow the execution code to continue executing. For example, the exception handler_1 may restore 934 the page attribute to allow the program to continue executing. In one configuration, the occurrence of the additional exception may be detected 936. For example, an exception handler_2 may detect the occurrence of the exception associated with the SINGLE_STEP. In addition, the memory protection may be reopened 938 and the method 920 may continue to monitor 926 the memory for an occurrence of an exception.

Figure 10:
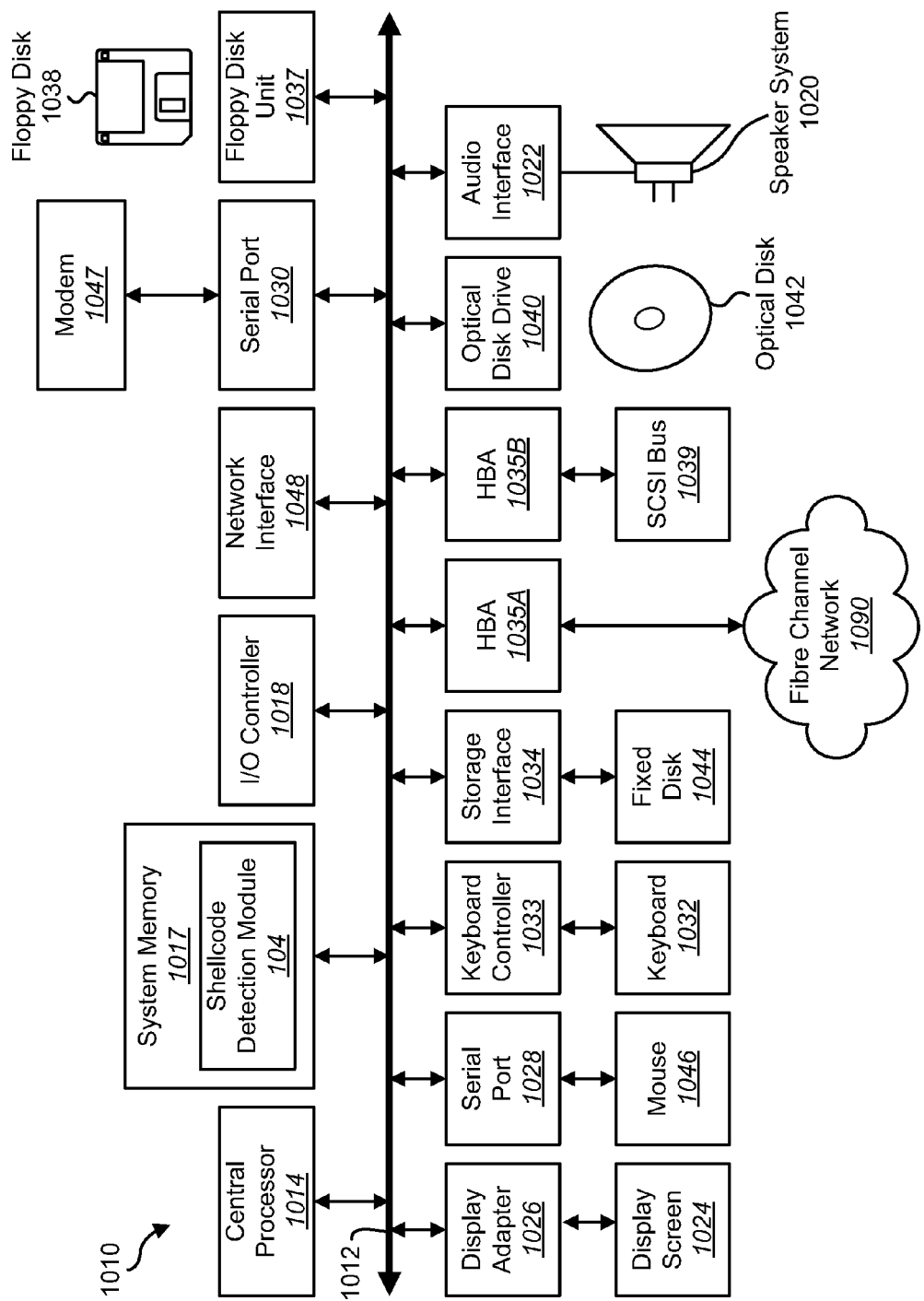
FIG. 10 depicts a block diagram of a computer system suitable for implementing the present systems and methods.

FIG. 10 depicts a block diagram of a computer system 1010 suitable for implementing the present systems and methods. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the shellcode detection module 104 to implement the present systems and methods may be stored within the system memory 1017. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present systems and methods. The devices and subsystems may be interconnected in different ways from that shown in FIG. 10. The operation of a computer system such as that shown in FIG. 10 is readily known in the art and is not discussed in detail in this application. Code to implement the present systems and methods may be stored in computer-readable storage media such as one or more of system memory 1017, fixed disk 1044, optical disk 1042, or floppy disk 1038. The operating system provided on computer system 1010 may be MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
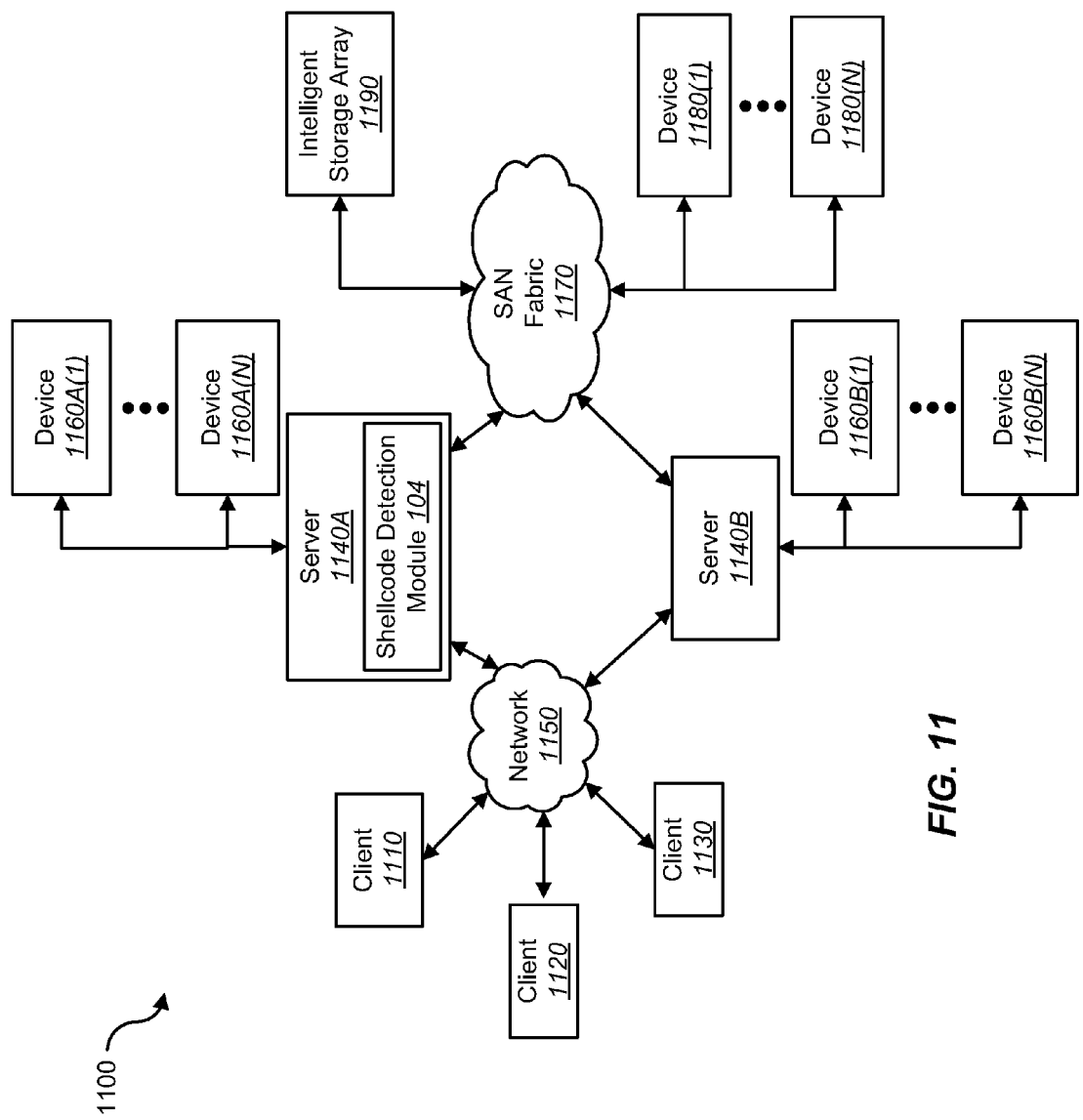
FIG. 11 is a block diagram depicting a network architecture in which client systems, as well as storage servers, are coupled to a network.

FIG. 11 is a block diagram depicting a network architecture 1100 in which client systems 1110, 1120 and 1130, as well as storage servers 1140A and 1140B (any of which can be implemented using computer system 1110), are coupled to a network 1150. In one embodiment, the shellcode detection module 104 may be located within a server 1140A, 1140B to implement the present systems and methods. The storage server 1140A is further depicted as having storage devices 1160A(1)-(N) directly attached, and storage server 1140B is depicted with storage devices 1160B(1)-(N) directly attached. SAN fabric 1170 supports access to storage devices 1180(1)-(N) by storage servers 1140A and 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120 and 1130 to network 1150. Client systems 1110, 1120 and 1130 are able to access information on storage server 1140A or 1140B using, for example, a web browser or other client software (not shown). Such a client allows client systems 1110, 1120 and 1130 to access data hosted by storage server 1140A or 1140B or one of storage devices 1160A(1)-(N), 1160B(1)-(N), 1180(1)-(N) or intelligent storage array 1190. FIG. 11 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for defending an attack from the execution of shellcode, comprising:
    duplicating elements within a dynamically linked library (dll), wherein the dll resides in a first memory space;
    redirecting the duplicated elements into a second memory space;
    establishing a protection attribute for the elements within the second memory space;
    modifying one or more links to point to elements within the second memory space instead of elements within the first memory space;
    determining a location of execution code attempting to access the elements within the second memory space; and
    preventing the execution code from executing based on the determined location.

2. The method of claim 1, wherein the dll comprises a kernel32.dll.

3. The method of claim 1, wherein the determined location of the execution code indicates the code is running on a heap memory allocation.

4. The method of claim 1, wherein the determined location of the execution code indicates the code is running on a stack memory allocation.

5. The method of claim 1, further comprising allowing the executing code to execute if the determined location indicates the code is not running on a heap or stack memory allocation.

6. The method of claim 1, wherein the modified links point to an InLoadOrderModuleList, an InMemoryOrderModuleList, and an In InitializationOrderModuleList.

7. The method of claim 1, wherein the protection attribute comprises a PAGE_GUARD|PAGE_ EXECUTE_READWRITE attribute.

8. The method of claim 1, further comprising establishing an exception handler to identify an exception raised by the protection attribute for elements within the second memory space.

9. The method of claim 8, further comprising using the exception handler to determine the location of the execution code attempting to access the elements within the second memory space.

10. A computer system configured to defend an attack caused by the execution of shellcode, comprising:
    a processor;
    memory in electronic communication with the processor;
    instructions stored in the memory, the instructions being executable by the processor to:
        duplicate elements within a dynamically linked library (dll), wherein the dll resides in a first memory space;
        redirect the duplicated elements into a second memory space;
        establish a protection attribute for the elements within the second memory space;
        modify one or more links to point to elements within the second memory space instead of elements within the first memory space;
        determine a location of execution code attempting to access the elements within the second memory space; and
        prevent the execution code from executing based on the determined location.

11. The computer system of claim 10, wherein the dll comprises a kernel32.dll.

12. The computer system of claim 10, wherein the determined location of the execution code indicates the code is running on a heap memory allocation.

13. The computer system of claim 10, wherein the determined location of the execution code indicates the code is running on a stack memory allocation.

14. The computer system of claim 10, wherein the instructions are executable by the processor to:
   allow the executing code to execute if the determined location indicates the code is not running on a heap or stack memory allocation.

15. The computer system of claim 10, wherein the modified links point to an InLoadOrderModuleList, an InMemoryOrderModuleList, and an In InitializationOrderModuleList.

16. The computer system of claim 10, wherein the protection attribute comprises a PAGE_ GUARD|PAGE_EXECUTE_READWRITE attribute.

17. The computer system of claim 10, wherein the instructions are executable by the processor to
   establish an exception handler to identify an exception raised by the protection attribute for elements within the second memory space.

18. A computer-program product for defending an attack from the execution of shellcode, the computer-program product comprising a non-transitory computer-readable medium storing instructions thereon, the instructions being executable by a processor to:
   duplicate elements within a dynamically linked library (dll), wherein the dll resides in a first memory space;
   redirect the duplicated elements into a second memory space;
   establish a protection attribute for the elements within the second memory space;
   modify one or more links to point to elements within the second memory space instead of elements within the first memory space
   determine a location of execution code attempting to access the elements within the second memory space; and
   prevent the execution code from executing based on the determined location.

* * * * *